United States Patent [19]
Forbes et al.

[11] Patent Number: 4,883,982
[45] Date of Patent: Nov. 28, 1989

[54] ELECTRONICALLY COMMUTATED MOTOR, BLOWER INTEGRAL THEREWITH, AND STATIONARY AND ROTATABLE ASSEMBLIES THEREFOR

[75] Inventors: Franklin L. Forbes, LaOtto; Eldon R. Cunningham, Fort Wayne, both of Ind.

[73] Assignee: General Electric Company, Fort Wayne, Ind.

[21] Appl. No.: 201,681

[22] Filed: Jun. 2, 1988

[51] Int. Cl.$^4$ .............................................. H02K 9/00
[52] U.S. Cl. ...................... 310/62; 310/59; 310/64; 310/67 R; 310/68 R; 310/91; 310/156; 318/254
[58] Field of Search ............... 310/67 R, 68 R, 68 D, 310/58, 59, 62, 63, 64, 65, 89, 90, 156, DIG. 6, 91; 165/80.3; 318/254

[56] References Cited

U.S. PATENT DOCUMENTS

| | | | |
|---|---|---|---|
| 2,596,783 | 5/1952 | Moore | 172/36 |
| 2,990,112 | 6/1961 | Levy | 310/67 R |
| 3,175,755 | 3/1965 | Rockafield | 230/117 |
| 3,576,378 | 4/1971 | Hilmanowski | 417/366 |
| 3,596,121 | 7/1971 | Chang | 310/67 R |
| 3,644,066 | 2/1972 | Heob et al. | 417/354 |
| 3,845,339 | 10/1974 | Merkle et al. | 310/156 |
| 3,858,069 | 12/1974 | Kuter et al. | 310/68 |
| 3,961,864 | 6/1976 | Papst et al. | 417/354 |
| 4,007,390 | 2/1977 | Muller et al. | 310/90 |
| 4,015,182 | 3/1977 | Erdman | 310/254 |
| 4,128,364 | 12/1978 | Papst et al. | 417/354 |
| 4,164,690 | 8/1979 | Muller et al. | 318/254 |
| 4,194,743 | 3/1980 | Ohsawa et al. | 274/1 |
| 4,259,603 | 2/1978 | Uchijama | 310/156 |
| 4,360,751 | 11/1982 | Arnold, Jr. et al. | 310/66 |
| 4,428,719 | 1/1984 | Hayashibara et al. | 417/354 |
| 4,459,519 | 7/1984 | Erdman | 318/254 |
| 4,510,409 | 4/1985 | Kanayama | 310/268 |
| 4,536,672 | 8/1985 | Kanayama et al. | 310/268 |
| 4,549,104 | 10/1985 | Niimura et al. | 310/67 |
| 4,554,473 | 11/1985 | Muller | 310/67 |
| 4,554,491 | 11/1985 | Plunkett | 318/254 |
| 4,574,211 | 3/1986 | Muller | 310/68 R |
| 4,609,040 | 9/1986 | Moore | 165/80.3 |
| 4,659,951 | 4/1987 | Angi et al. | 310/62 |
| 4,668,898 | 5/1987 | Harms | 310/68 R |
| 4,682,065 | 7/1987 | English | 310/67 R |
| 4,694,210 | 9/1987 | Elliott | 310/67 R |
| 4,698,542 | 10/1987 | Muller | 310/67 |
| 4,716,494 | 12/1987 | Bright | 165/80.3 |
| 4,757,221 | 7/1988 | Kurihashi | 310/62 |

FOREIGN PATENT DOCUMENTS 0891883 8/1953 Fed. Rep. of Germany ........ 310/63

Primary Examiner—R. Skudy
Attorney, Agent, or Firm—Ralph E. Krisher, Jr.

[57] ABSTRACT

A motor assembly for use in combination with an air handling system such as an automotive blower system for supplying cooling or heating air to a passenger compartment of an automobile. The assembly comprises a support member which is adapted to be mounted on the air handling system. Stationary and annular rotatable assemblies are mounted on one side of the support plate and a printed circuit board including a motor control circuit is mounted on the other side thereof. The stationary assembly has a plurality of winding stages adapted to be electrically energized to generate an electromagnetic field. The annular rotatable assembly has a plurality of permanent magnet elements surrounding the stationary assembly and is adapted to engage a squirrel cage fan for moving air in the air handling system. The control circuit is connected to the winding stages for applying a voltage to one or more of the winding stages at a time and for commutating the winding stages in a preselected sequence to rotate the rotatable assembly. The support member has an opening in communication with apertures in the stationary and rotatable assemblies so that impellers on the rotatable assembly cool the control circuit by drawing air over it and through the opening and apertures.

40 Claims, 6 Drawing Sheets

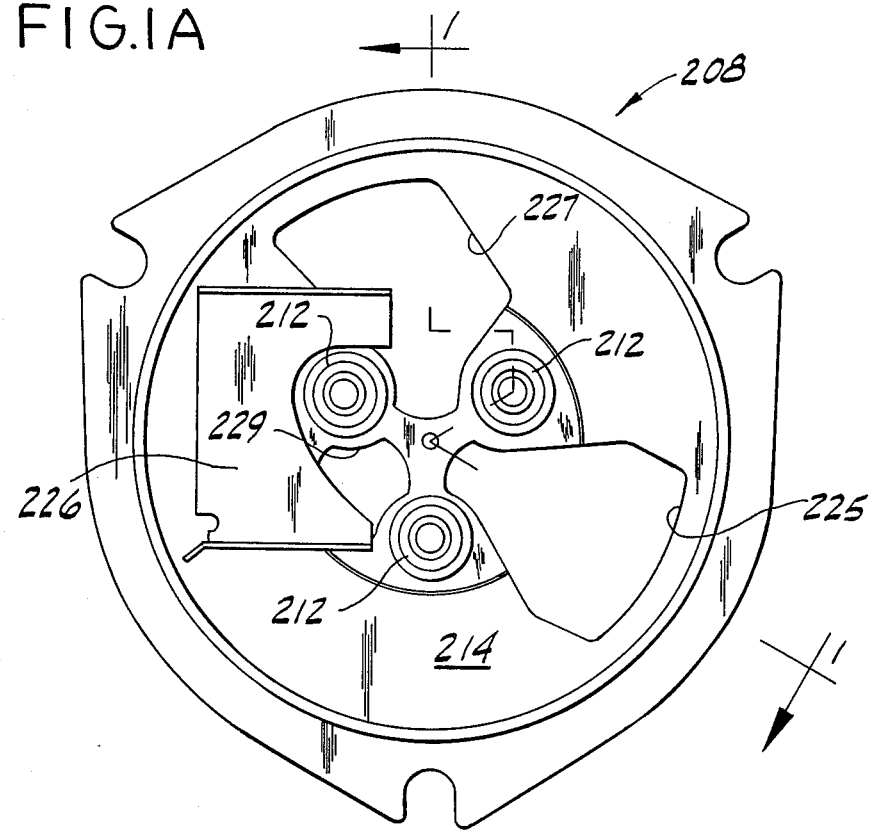
FIG.IA

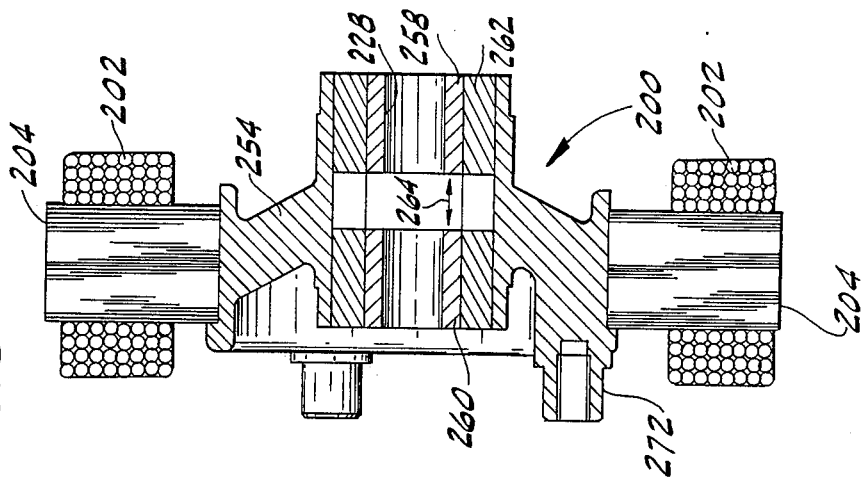
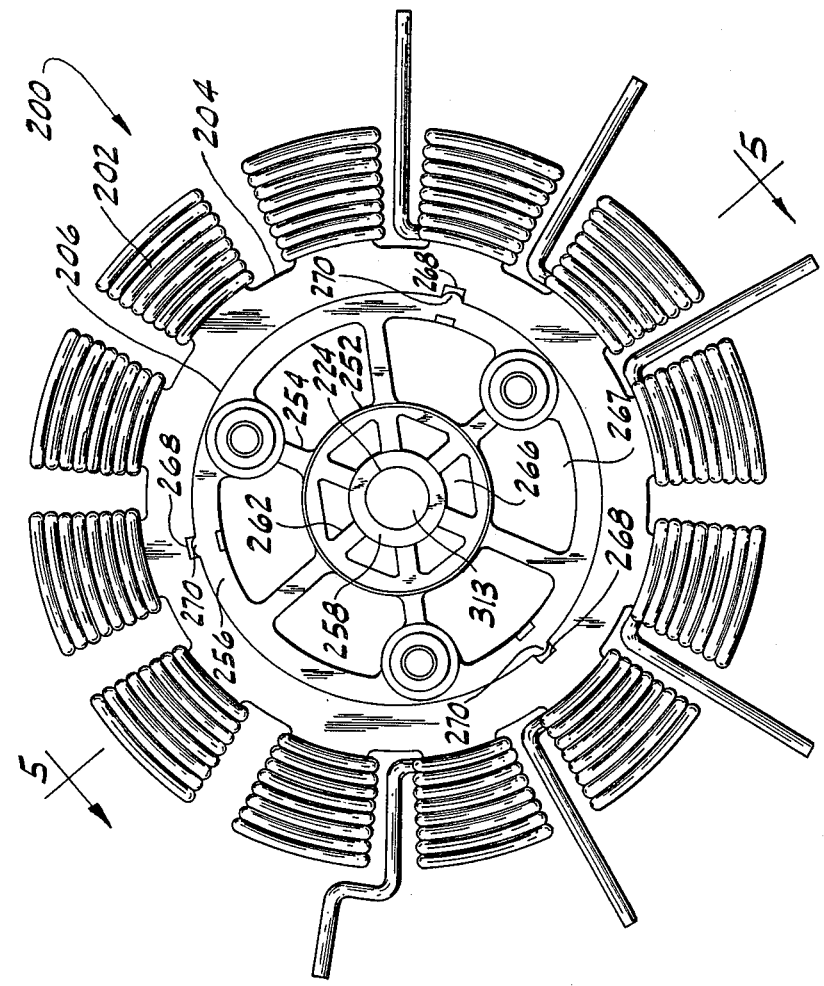

ELECTRONICALLY COMMUTATED MOTOR, BLOWER INTEGRAL THEREWITH, AND STATIONARY AND ROTATABLE ASSEMBLIES THEREFOR

FIELD OF THE INVENTION

This invention relates in general to dynamoelectric machines and application systems for such machines. More particularly, this invention relates to an electronically commutated motor and electronically commutated motor with integral blower apparatus.

BACKGROUND OF THE INVENTION

While conventional brush-commutated DC motors may have advantageous characteristics, including convenience of changing operational speeds, there may be disadvantages such as brush wear, electrical loss, noise and radio frequency interference caused by sparking between the brushes and the segmented commutator, which may limit the applicability of such brush-commutated DC motors in some fields such as the vehicular blower control field. Electronically commutated motors, such as brushless DC motors and permanent magnet motors with electronic commutation, have now been developed and generally are believed to have the above-discussed advantageous characteristics of the brush-commutated DC motors without many of the disadvantages thereof while also having other important advantages. Such electronically commutated motors are disclosed in the David M. Erdman U.S. Pat. Nos. 4,015,182 and 4,459,519 for instance. These electronically commutated motors are advantageously employed, for instance, commutated motors in air conditioning for cooling and warming of vehicular compartments.

In an automotive temperature control system a variable resistance can be used to vary the speed of a brush-type blower motor, but this would further reduce the energy efficiency of the system. While there are some losses engendered by electronic switching of an electronically commutated motor, these are negligible compared to brush losses and rheostat losses in prior art variable speed blower systems.

Further improvements in control systems, electronically commutated motor systems, blower apparatus and methods of control and operation can beneficially contribute to more widespread use of such motors in various applications including vehicular blower control. For example, sudden changes in the blower speed control setting can lead to wasted electrical energy due to an inrush current to the motor and produce annoying air sounds as the operating level is changed. Improvements which achieve increased electrical efficiency and user convenience would be desirable. Economy of manufacture would also be enhanced by circuit improvements if they can be made with little extra cost as part of improved integrated circuit chips. Greater versatility of response to various control signal conditions and improved fail-safe features would also be desirable.

The control circuitry required to electronically commutate a brushless DC motor is typically mounted remote from the motor in a location where the circuitry can be adequately cooled and unaffected by motor heat. In applications where the control circuitry is mounted on or in proximity to the motor, a dedicated cooling mechanism such as a fan wheel is generally employed to provide the required heat dissipation, i.e., the mechanism is provided primarily for the purpose of cooling the control circuitry. Alternatively, in applications where the motor is part of a blower cooling system, the control circuitry may be mounted on a printed circuit board on the stator and cooled by air moved by the blower assembly. In the former case, the dedicated cooling mechanism results in additional cost and failure of such mechanism results in added maintenance expenses. In the latter case, the control circuitry may not be sufficiently cooled and may not be accessed for repair or maintenance without disassembly of the motor.

SUMMARY OF THE INVENTION

Among the objects of this invention are to provide an improved electronically commutated motor and improved electronically commutated motor and blower apparatus which overcome at least some of the disadvantageous conditions discussed above; the provision of an improved electronically commutated motor and an improved electronically commutated motor and blower apparatus which substantially dissipate motor heat and adequately cool the control circuitry; the provision of an improved electronically commutated motor and an improved electronically commutated motor and blower apparatus which are reliable, economical and convenient to use; the provision of an improved electronically commutated motor with integral blower apparatus and integral control circuitry cooled by the movement of air caused by said integral blower apparatus.

Generally, one form of the invention is a motor assembly comprising a support member adapted to be mounted on a stationary support for supporting the motor assembly and having first and second opposite sides. A stationary assembly is mounted on the first side of the support member and has a plurality of winding stages adapted to be electrically energized to generate an electromagnetic field. An annular rotatable assembly including a plurality of permanent magnet elements surrounds said stationary assembly. Control means, connected to the winding stages and positioned on the second side of said support member, applies a voltage to one or more of the winding stages at a time and commutates the winding stages in a preselected sequence to rotate the rotatable assembly.

Another form of the invention is a motor assembly comprising a support member adapted to be mounted on a stationary support for supporting the motor assembly, and an annular rotatable assembly including a plurality of permanent magnet elements. A stationary assembly is mounted on the support member and is within and supports the rotatable assembly. The stationary assembly has a plurality of winding stages adapted to be electrically energized to generate an electromagmetic field for rotating the rotatable assembly. The support member and/or the rotatable assembly and/or stationary assembly may be provided with openings in communication with each other.

In yet another form, the invention is a motor assembly comprising a support member adapted to be mounted on a stationary support for supporting said motor assembly. An annular rotatable assembly includes a housing supporting a plurality of permanent magnet elements and means on the housing located between the housing and the support member for moving air from a central area of the annular rotatable assembly to a peripheral area thereof. A stationary assembly is mounted on the support member and within and supporting the rotatable assembly, the stationary assembly having a plurality of winding stages adapted to be electrically energized to generate an electromagnetic field for rotating the rotatable assembly.

Another form of the invention is a rotatable assembly for use in a dynamoelectric machine. The assembly comprises a housing having a peripheral portion. A plurality of permanent magnet elements are positioned around the peripheral portion of the housing. Impeller means, on the housing, moves air about the dynamoelectric machine as the rotatable assembly is caused to rotate.

Still another form of the invention is a stationary assembly for use in a dynamoelectric machine. The assembly comprises a ferromagnetic core having a plurality of winding slots therein and defining a bore adapted to receive a shaft of a rotatable assembly of the dynamoelectric machine. A plurality of apertures around the bore are adapted to permit air flow therethrough. A plurality of winding stages are associated with the slots and adapted to be energized to rotate the rotatable assembly of the dynamoelectric machine.

Other objects and features will be in part apparent and in part pointed out hereinafter.

BRIEF DESCRIPTION OF THE DRAWINGS

FIG. 1A is a front plan view of the support member of the motor of the invention;

FIG. 4 is a plan view of the stationary assembly of the motor of the invention;

FIG. 5 is an axial cross-sectional view of the stationary assembly of the motor of the invention taken along lines 5—5 of FIG. 4;

Corresponding reference characters indicate corresponding parts throughout the several views of the drawings.

DETAILED DESCRIPTION OF PREFERRED EMBODIMENTS

Figure 1:
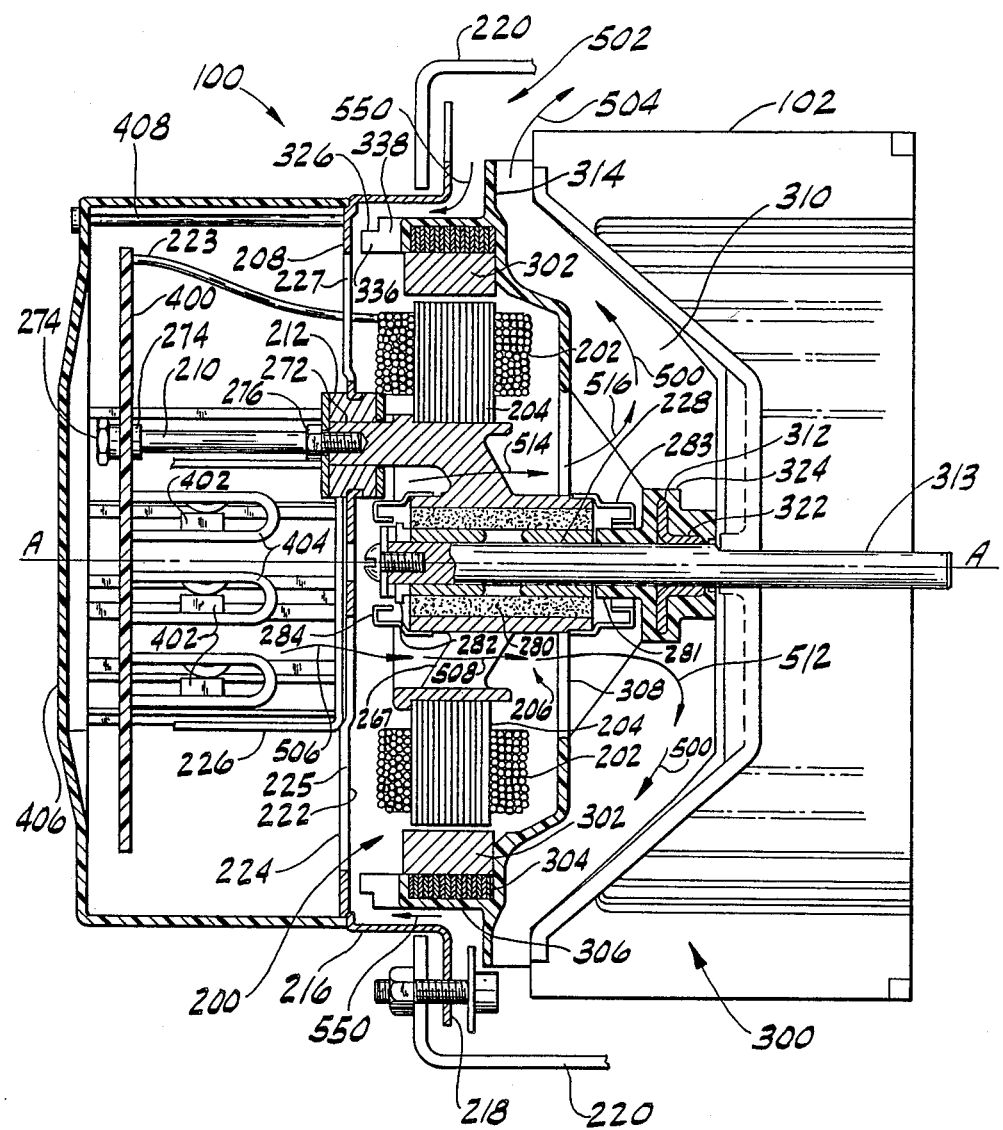
FIG. 1 is an axial cross-sectional view of the electronically commutated brushless DC motor of the invention in combination with a squirrel cage blower attached to the front end of the motor taken along lines 1—1 FIG. 1A.

Referring now to the drawings, and more particularly to FIG. 1, reference character 100 generally designates a brushless electronically commutated DC motor comprising stationary assembly 200 located at the center of the motor and an annular rotatable assembly 300 which surrounds the stationary assembly. An annular squirrel cage fan 102 or other means for moving air through an air handling system engages and is mounted on rotatable assembly 300 and is adapted to be rotatably driven thereby. Specifically, motor assembly 100 is for use in combination with an air handling system such as an automotive blower system for supplying cooled or heated air to a passenger compartment of an automobile.

Stationary assembly 200 comprises a plurality of winding stages 202 adapted to be electrically energized to generate an electromagnetic field. Stages 202 are coils of wire wound around the teeth of laminated stator core 204 having a central opening within which bearing housing 206 is mounted. Bearing housing 206, in turn, is mounted on support member 208 by a plurality of internally threaded bosses 272 which engage a threaded end of stand-off studs 210. Elastomeric grommets 212 resiliently support stationary assembly 200 and separate the bosses 272 of bearing housing 206 from support member 208 for noise isolation. As shown in FIGS. 1 and 1A, support member 208 is a substantially flat, substantially circular rigid plate 214 having a plurality of inlet openings 225,227,229 therein to permit air flow therethrough and having a circumferential annular rim 216 substantially perpendicular to plate 214. Rim 216 terminates in a radial flange 218 perpendicular to rim 216 and parallel to plate 214. Flange 218 is adapted to be mounted on stationary support member 220 such as the ductwork of an automobile blower system or other air handling system for supporting motor assembly 100.

Referring again to FIG. 1, support member 208 has a first side 222 on which stationary assembly 200 is mounted and a second side 224 on which control means for applying a voltage to one or more of the winding stages at a time and for commutating the winding stages in a preselected sequence to rotate the rotatable assembly 300 is mounted. In particular, the control means comprises a plurality of electronic components connected to the winding stages and mounted on printed circuit board 400 which is connected to the coils of stages 202 via one or more wires 223. Circuit board 400 is mounted on stand-off studs 210 in spaced relation to the support member 208. In practice, the electronic components are surface mounted on both sides of printed circuit board 400 permitting the entire control circuit to be included thereon. However, for simplicity, FIG. 1 only shows some of the components. In particular, power transistors 402 are mounted to U-shaped heat sinks 404 which are partially surrounded by U-shaped air director 226 mounted to support member 208 for directing moving air toward heat sinks 404.

Rotatable assembly 300 comprises a plurality of radially magnetized permanent magnet segments 302 which combine to form a ring secured to the inner periphery of edgewise wound rotor flux ring 304 and aligned with stator core 204. Segments 302 constitute magnetic elements of annular rotatable assembly 300 which surround stationary assembly 200. Rotor flux ring 304 is secured to and integral with molded annular housing 306 which, in turn, is integral with radial rotor wall 308. A plurality of radial arcuate vanes 310 (not shown in cross-section in FIG. 1) extend from central rotor hub 312 to rotor wall 308. Vanes 310 constitute impeller means on a first or front side of rotatable assembly 300 for moving air over board 400 and through openings 225,227,229 in heat exchange relationship to board 400. Rotor hub 312 is securely, coaxially mounted on rotor shaft 313 which is coaxial with central axis A—A of the motor assembly 100. Shaft 313 is positioned within bore 228 of bearing housing 206.

The rear portion of motor assembly 100, including printed circuit board 400, is enclosed in end cap 406 which is mounted on and supported by support member 208 via fastening screws 408.

Figure 2:
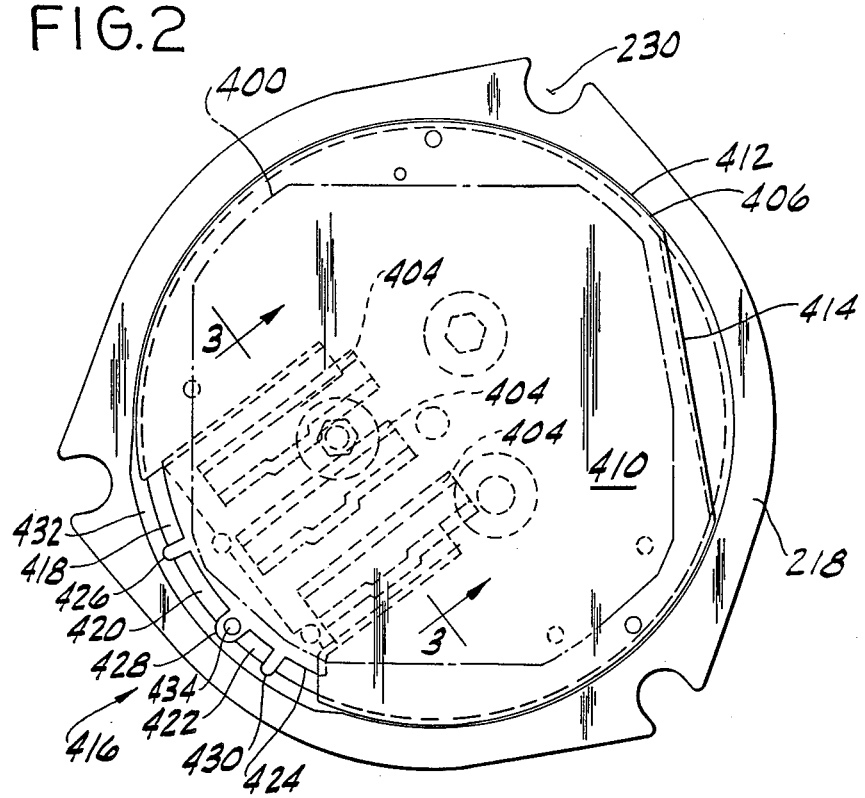
FIG. 2 is a rear plan view of the motor of the invention illustrated in FIG. 1 with some parts which are located under the end cap shown in phantom.

Referring to FIG. 2, end cap 406 is mounted on the rear portion of motor assembly 100 and encloses the control means of the motor between cap 406 and support member 208. Portions of the control means are shown in FIG. 2 in phantom. Radial flange 218 of support member 208 is located along the circumference of end cap 406. As shown in FIGS. 1A and 2, radial flange 218 includes notches 230 in which fasteners such as bolts may be located for engaging stationary support member 220 (shown in FIG. 1).

End cap 406 includes substantially circular back wall 410 and side wall 412 along the circumference of the back wall. Side wall 412 may include a flat portion 414. In addition, side wall 412 includes air inlet 416 for supplying air to the impeller means and having openings 418, 420, 422, and 424 into which ambient air may be drawn by rotation of the rotatable assembly 300 as noted below. The openings are spaced apart by ribs 426, 428, and 430 which span between the back wall 410 and peripheral ring 432 of side wall 412. Any of the ribs, such as rib 428, may be provided with an axial opening 434 through which a fastening screw may be located to engage support member 208 to firmly hold end cap 406 to support member 208.

Figure 3:
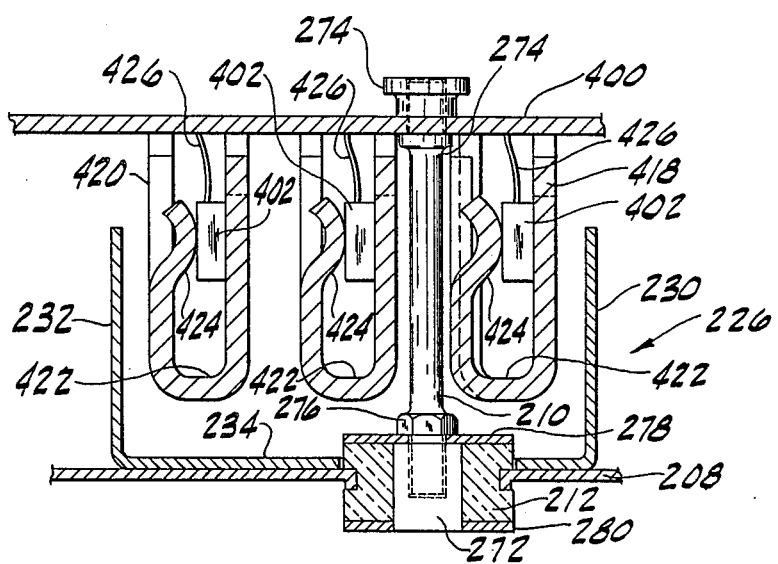
FIG. 3 is a partial cross-sectional view of the motor of the invention taken along lines 3—3 of FIG. 2.

Openings 418, 420, 422, and 424 are adjacent heat sinks 404 so that air drawn in through these openings is directed over the heat sinks 404. In particular, as shown in FIG. 3, U-shaped air director 226 includes substantially parallel legs 230 and 232 mounted on and perpendicular to base 234 and parallel to the legs of heat sinks 404. Base 234 is mounted on support member 208 such that heat sinks 404 are located between legs 230 and 232. Each heat sink includes legs 436 and 438 parallel to each other and perpendicularly connected to base 440. Power transistor 402 is located in an indentation of heat sink 404 and is held in place by opposing projection 442. transistor 402 is connected to printed circuit board 400 by conductor 444.

Referring to FIGS. 4 and 5, stationary assembly 200 is illustrated as having a wheel-like construction including bearing housing 206 press-fitted into laminated stator core 204. The bearing housing includes a central hub 252 integral with a plurality of regularly spaced apart radial struts 254 which, like spokes of a wheel, support the central hub 252 coaxially within outer rim 256. Central hub 252 defines a bore 224 for receiving the rotor shaft. In particular, bore 224 is defined by cylindric bearing members 258, 260, each having an axial opening therein adapted to receive the rotor shaft, and coaxially held in place by radial positioning members 262 which extend the length of the hub. Radial positioning members 262 are spaced at regular intervals around the hub and apertures 266 between adjacent members are filled with means for lubricating such as a lubricant-soaked packing material 280 for lubricating bore 224 so that the means for lubricating surrounds the bearing members. Lubricant is permitted to flow into bore 224 between bore 224 and rotor shaft 313 via gap 264 between the bearing members 258 and 260 shown in FIG. 5. As shown in FIG. 1, oil thrower washers 281 and 282 and seals 283 and 284 retain the lubricant within packing material 280. Screw 285 and washer 286 retain rotor shaft 313 with rotatable housing 300.

A plurality of apertures 267 are formed by adjacent radial struts 254, central hub 252 and outer rim 256 at regularly spaced apart intervals. Apertures 267 are in communication with openings 225, 227, 229 to permit air to flow through the stationary assembly 200. Apertures 267 are regularly spaced around bore 224.

In order to firmly secure the bearing housing within the central opening of laminated stator core 204, core 204 is provided with a plurality of axial grooves 268 spaced at regular intervals which function as keyways for keys which are formed from the outer rim 256 by deforming a portion 270 thereof into grooves 268.

The laminated stator core 204 defines a plurality of teeth having slots therebetween, such as the twelve teeth and slots illustrated in FIG. 4. Each tooth carries a coil of wire received in the slot which forms a portion of a winding stage of stationary assembly 200. In the embodiment illustrated in FIG. 4, it is contemplated that three winding stages may be provided, one stage wound around the first, fourth, seventh and tenth teeth, a second stage wound around the second, fifth, eighth and eleventh teeth and a third stage wound around the remaining teeth.

Referring to FIGS. 1, 3 and 5, bearing housing 206 also includes internally threaded bosses 272 for supporting stationary assembly 200. Bosses 272 are integral with the outer rim 256 and parallel to the central axis A—A and the coaxial axis of central hub 252. As shown in FIG. 1, stand-off studs 210 are rods threaded at each end thereof, with one end engaging the internal threads of bosses 272 and the other end engaging a nut 274 for securing printed circuit board 400 onto stud 210. Stud 210 is also provided with ridge 274 for supporting circuit board 400 and ridge 276 for retaining washer 278 against boss 272. Washer 280 is located at the base of boss 272. Between washers 278 and 280, elastomeric grommet 212 or other elastomeric member is sandwiched and located within an opening in support member 208 to provide a vibration isolation mounting between the support member 208 and the remainder of motor assembly 100 and to resiliently support board 400 as well as stationary assembly 200. Grommet 212 has a coaxial bore for receiving boss 272.

Figure 6:
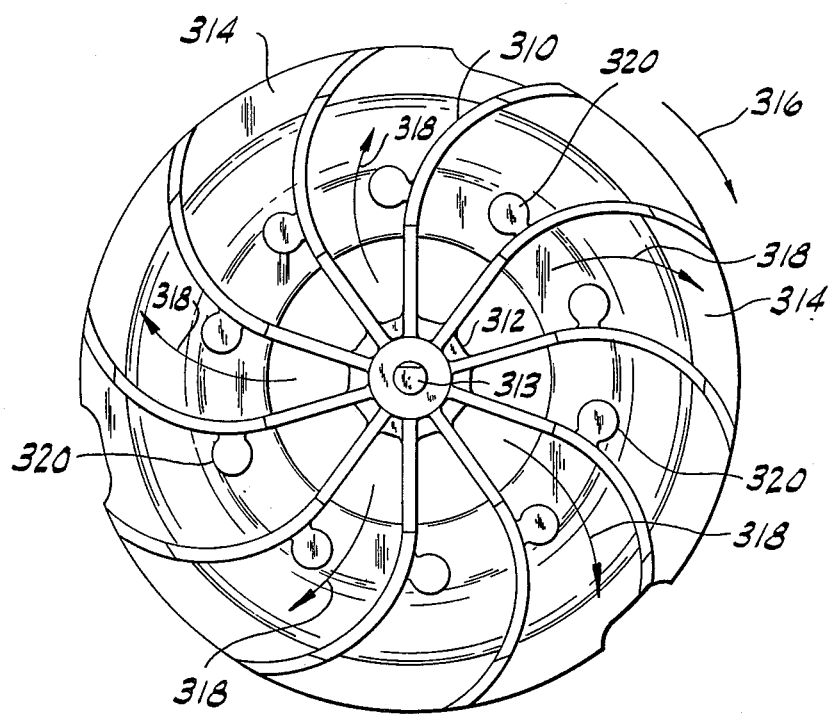
FIG. 6 is a front plan view of the motor of the invention illustrating the front of the rotatable assembly.
Figure 7:
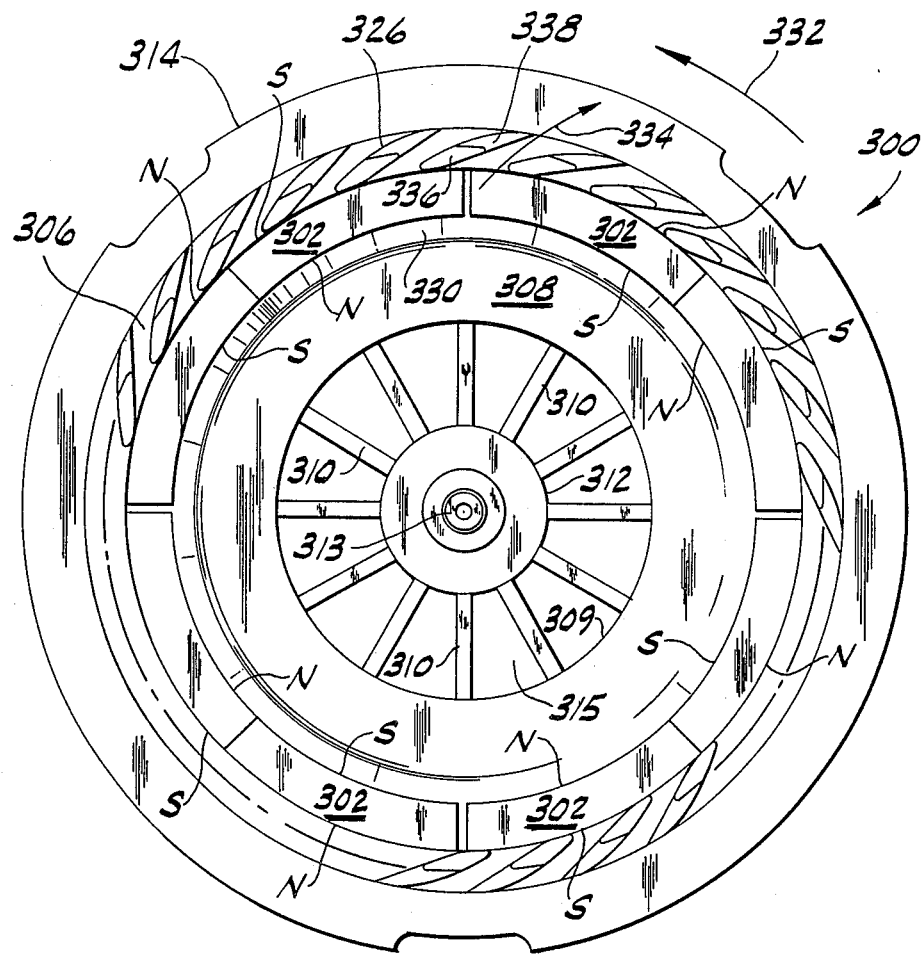
FIG. 7 is a rear plan view illustrating the rear of the rotatable assembly of the motor of the invention.

Referring to the annular rotatable assembly 300 as illustrated in FIGS. 6 and 7, a plurality of radial arcuate vanes 310 extend from the central rotor hub 312 to the outer edge of peripheral flange 314 extending in a radial plane with respect to the rotor. Vanes 310 are curved in the direction of rotation as indicated by arrow 316 as it is rotated by the electromagnetic field generated by stationary assembly 200. Vanes 310 move air from central hub 312 (a central area of rotatable assembly 300) toward peripheral flange 314 (a peripheral area of rotatable assembly 300) as indicated by arrows 318. The annular rotatable assembly 300 is preferably molded of a glass-reinforced synthetic resin such as TEMPALLOY (Trade Mark) and may include a plurality of solid posts 320 integral with vanes 310. Posts 320 provide additional support to each of the radial arcuate vanes 310, can function as ejection pins during the molding process, and also provide mass to the rotor which may be selectively removed in order to balance the rotor, i.e., posts 320 may be filed, sanded, cut or otherwise reduced in size to balance rotatable assembly 300.

As shown in FIG. 1, molded within hub 312 is cylindrical reinforcing member 322 which reinforces hub 312 and securely and firmly engages rotor shaft 313. Member 322 may be provided with radial flange 324 which is also molded within the hub 312 to add additional strength and rigidity to, hub 312.

Referring to FIG. 7, molded annular rotor housing 306, which encloses the edgewise wound flux ring 304 (shown in FIG. 1), is provided with a plurality of fins 326 spaced at close, regular intervals on the rear face of housing 306. Fins 326 extend generally circumferentially and are directed slightly radially inwardly. Fins 336 constitute impeller means on a second or rear side of rotatable assembly 300 for moving air over board 400 and through openings 225,227,229 in heat exchange relationship to board 400. Arrow 332 indicates the direction of rotation of annular rotatable assembly 300 as it is rotated by the electromagnetic field generated by stationary assembly 200. Therefore, fins 326 are positioned to move air from central hub 312 (a central area of rotatable assembly 300) toward peripheral flange 314 (a peripheral area of rotatable assembly 300) as indicated by arrow 334. Fins 326 may be provided with an inner end 336 and an outer end 338, inner and outer referring to the relative position of the flange with respect to the central axis A—A of the motor assembly. Preferably, outer end 338 is provided with a reduced axial dimension, i.e., reduced width in order to provide clearance between the fins and support member 208 yet provide maximum surface area to facilitate air movement toward the periphery of the annular rotatable assembly 300. Fins 326 are an integral portion of the molded annular housing 306.

Positioned immediately radially inwardly from molded annular housing 306 and preferably in contact with the flux ring within housing 306 are four arcuate magnet segments 302 alternately radially polarized to form eight (8) poles as indicated by S for south and N for north. The front surface of magnets 302 abut against the molded housing 306 which forms an internal circular shoulder 330 terminating in radial wall 328. Vanes 310 are substantially perpendicular to wall 308 and shoulder 330 as well as perpendicular to peripheral flange 314. Apertures 315 within rotatable assembly 300 are formed by vanes 310, the inner circumferential edge 309 of wall 308 and the outer circumference of central rotor hub 312. Apertures 315, apertures 267 in stationary assembly 200, openings 225,227,229 in support member 208 and air inlet 416 are in communication with each other to permit air flow from inlet 416 to outlet 502.

The motor assembly 100 according to the invention operates in the following manner. Generally, four connectors are connected to PC board 400, two connectors supply DC power to PC board 400 and two connectors supply a DC signal to boar 400 indicating the desired torque or operating speed of motor assembly 100. End cap 406 may have an integral receptacle connected to PC board 400 for receiving a plug or other fixture. Alternatively, a wiring harness may be connected to board 400 and pass through an aperture in end cap 406, the wire harness terminating in a connector for connection to the automotive blower control system. When a DC voltage is supplied to board 400 and a signal supplied to board 400 indicates that motor assembly 100 should be operating, the control circuitry of board 400 selectively applies a DC voltage to the winding stages of stationary assembly 200 and commutates the winding stages to rotate the rotatable assembly 300 thereby rotating the annular squirrel cage fan 102 and moving air through the automotive air handling system. As rotatable assembly 300 rotates, air between adjacent radial arcuate vanes 310 is forced from the central hub 312 toward the peripheral flange 314 as indicated by arrow 500 in FIG. 1. The gap 502 between the stationary support member 220 and the outer peripheral edge of vane 310 forms an outlet which supplies the air pumped by vanes 310 as indicated by arrow 504.

As the annular rotor assembly 300 continues to rotate, an air pressure gradient across the outer face of assembly 300 is created. The air pressure is lowest at the innermost radial portion near the central rotor hub 312 and central axis A—A and is highest at the outermost radial portion near the peripheral flange 314. As a result, there is a significant pressure differential between the center of rotatable assembly 300 and air inlet 416 in end cap 406. This pressure differential causes air to flow through air inlet 416, over heat sinks 404 as directed by air director 225, and through openings 225,227,229 in support member 208. Air inlet 416, openings 225,227,229, apertures 254, apertures 267 and gap 502 are in communication with each other to permit continuous air flow therethrough, i.e., they are aligned to facilitate air flow as indicated by the arrows. Some of the air will be directed as indicated by arrow 506 through opening 227 and then, as indicated by arrow 508, through the apertures formed between radial struts 254 and finally through apertures 267 formed by vanes 310 as indicated by arrow 510. In addition, as indicated by arrow 512, air will also flow from air inlet 416, as directed by director 226 over heat sink 404, through openings 225 and 229, through the apertures 267 formed between struts 254 indicated by arrow 514 and finally through the apertures 267 formed between vanes 310 as indicated by arrow 516. As rotor assembly 300 rotates, annular squirrel cage fan 102 also rotates to create a pressure differential assisting in movement of the air from the center of the motor assembly 100 toward the periphery thereof. It is contemplated that the squirrel cage fan would pump approximately 250 cubic feet per minute (C.F.M) of air within the automobile air handling system and that vanes 310 would move approximately 25 C.F.M. over the heat sinks 404 to cool the power transistors 402 at about 3000 r.p.m. of motor 100.

The pressure differential resulting from the higher pressure along the periphery of rotatable assembly 300 and particularly at outlet 502 can result in a back flow of air as indicated by arrows 550. For this reason, fins 326 are provided and constitute means on the rotatable assembly for inhibiting air on the first side 222 of support member 208 flowing back through inlet openings 225,227,229 to the second side 224 of support member 208. Fins 326 are sized and angled to inhibit air movement between support member 208 and the stationary and rotatable assemblies from outlet 502 to the openings in the support member. If desired, fins 326 may be configured to move such air toward outlet 502. Therefore, openings 225,227,229 are adapted to permit air on the second side 224 to flow therethrough to the first side. Approximately a 10% loss in air flow volume or 25 C.F.M can result if no means, such as fins 326, are provided to inhibit this back flow of air. As a result, annular rotatable assembly 300 is provided with means on the front side thereof in the form of vanes 310 and means on the rear side thereof in the form of fins 326 for moving air from the center of rotatable assembly 300 toward its periphery.

The actual volume of air which is pumped through the automobile air handling system by squirrel cage fan 102 and the volume of air pumped by rotatable assembly 300 through air inlet 416 depends upon the speed or torque of the motor 100 and the resistance flow within the air handling system. The resistance to flow depends, in part, on the mode of operation. For example, the air flow through the condenser coils of a compressor may encounter a different resistance than the air flow through a heating coil. In general, the surface area and directional pitch of vanes 310 and fins 326 should be adjusted as required to meet the needs of the particular air handling system with which motor 100 is used.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A motor assembly comprising:
   a support member adapted to be mounted on a stationary support for supporting said motor assembly and having a first side and a second side opposite the first side, said support member having at least one opening therein adapted to permit airflow therethrough;
   a stationary assembly mounted on the first side of said support member and having a plurality of winding stages adapted to be electrically energized to generate an electromagnetic field;
   an annular rotatable assembly on the first side of said support member and including a plurality of permanent magnetic elements surrounding said stationary assembly;
   control means, connected to the winding stages and mounted on the second side of said support member, for applying a voltage to one or more of the winding stages at a time and for commutating the winding stages in a preselected sequence to rotate the rotatable assembly; and
   impeller means on said rotatable assembly for moving air in heat exchange relationship with said control means and through the opening in said support member.

2. The assembly of claim 1 further comprising means, connected to said rotatable assembly, for moving air through an air handling system including a stationary support to which said support member is adapted to be mounted.

3. The assembly of claim 2 wherein said means for moving air comprises a fan mounted on said rotatable assembly and adapted to be rotatably driven thereby.

4. The assembly of claim 1 wherein said rotatable assembly includes a rotor housing having first and second opposite sides with the second side of said rotatable assembly facing the first side of said support member; and wherein said impeller means comprises a plurality of vanes mounted on the first side of the rotor housing.

5. The assembly of claim 4 wherein said impeller means further comprises a plurality of fins mounted on the second side of the rotor housing.

6. The assembly of claim 5 wherein the vanes and fins are oriented with respect to the rotor housing to move air from a central area of said annular rotatable assembly to a peripheral area of said annular rotatable assembly as said annular rotatable assembly is rotated by the electromagnetic field generated by said stationary assembly.

7. The assembly of claim 1 wherein the opening of said support member is adapted to permit air on the second side to flow through the opening to the first side and further comprising means on said rotatable assembly for inhibiting air on the first side flowing back through the inlet opening to the second side.

8. The assembly of claim 7 wherein said means for inhibiting comprises a plurality of fins on said rotatable assembly between said support member and said rotatable assembly for moving air from a central area of said annular rotatable assembly to a peripheral area of said annular rotatable assembly as said rotatable assembly is rotated by the electromagnetic field generated by said stationary assembly.

9. The assembly of claim 1 further comprising an end cap covering mounted on said support member enclosing said control means between the cap and said support member, said end cap having an air inlet adapted to supply air to said impeller means.

10. The assembly of claim 1 wherein said control means includes a heat sink and further comprising means on said support member for directing moving air toward said heat sink.

11. The assembly of claim 10 wherein said means for directing comprises a U-shaped member having substantially parallel legs mounted on a base substantially perpendicular to the legs, the base mounted on said support member such that the heat sink is located between the legs.

12. The assembly of claim 1 further comprising means for resiliently supporting said stationary assembly and said control means on said support member.

13. The assembly of claim 12 wherein said means for resiliently supporting comprises an elastomeric member located within an opening in said support member and having a coaxial bore therein, and means on said stationary assembly for supporting said control means, said means for supporting located within the axial bore.

14. The assembly of claim 13 wherein said means for supporting comprises a boss on said stationary assembly and located within the axial bore and a rod having one end adapted to engage said boss and having another end adapted to engage said control means.

15. The assembly of claim 1 wherein said control means comprises a printed circuit board having a control circuit connected to the winding stages.

16. A motor assembly for use in combination with an air handling system such as an automotive blower system for supplying air to a passenger compartment of an automobile, said assembly comprising:
   a support member adapted to be mounted on the air handling system and having a first side and a second side opposite the first side, said support member having at least one opening therein to permit airflow therethrough;
   a stationary assembly mounted on the first side of said support member and having a plurality of winding stages adapted to be electrically energized to generate an electromagnetic field;
   an annular rotatable assembly including a plurality of permanent magnet elements surrounding said stationary assembly and adapted to engage means for moving air in the air handling system;
   control means, connected to the winding stages and positioned on the second side of said support member, for applying a voltage to one or more of the winding stages at a time and for commutating the winding stages in a preselected sequence to rotate the rotatable assembly; and
   impeller means on said rotatable assembly for moving air in heat exchange relationship with said control means and through the opening in said support.

17. The assembly of claim 16 wherein said rotatable assembly includes a rotor housing having first and second opposite sides with the second side of said rotatable assembly facing the first side of said support member; and wherein said impeller means comprises a plurality of vanes mounted on the first side of the rotor housing.

18. The assembly of claim 17 wherein said impeller means further comprises a plurality of fins mounted on the second side of the rotor housing.

19. The assembly of claim 18 wherein the vanes and fins are oriented with respect to the rotor housing to move air for a central area of said annular rotatable assembly to a peripheral area of said annular rotatable assembly as said annular rotatable assembly is rotated by the electromagnetic field generated by said stationary assembly.

20. The assembly of claim 16 wherein the opening of said support member is adapted to permit air on the second side to flow through the opening to the first side and further comprising means on said rotatable assembly for inhibiting air on the first side flowing back through the inlet opening to the second side.

21. The assembly of claim 20 wherein said means for inhibiting comprises a plurality of fins on said rotatable assembly between said support member and said rotatable assembly for moving air from a central area of said annular rotatable assembly to a peripheral area of said annular rotatable assembly as said rotatable assembly is rotated by the electromagnetic field generated by said stationary assembly.

22. The assembly of claim 16 further comprising an end cap covering mounted on said member enclosing said control means between the cap and said support member, said end cap having an air inlet adapted to supply air to said impeller means.

23. The assembly of claim 16 wherein said control means includes a heat sink and further comprising means on said support member for directing moving air toward said heat sink.

24. The assembly of claim 16 further comprising means for resiliently supporting said stationary assembly and said control means on said support member.

25. A motor assembly comprising
a support member adapted to be mounted on a stationary support for supporting said motor assembly and having at least one opening therein adapted to permit air flow therethrough;
an annular rotatable assembly including a plurality of permanent magnet elements;
a stationary assembly mounted on said support member and within and supporting said rotatable assembly, said stationary assembly having a plurality of winding stages adapted to be electrically energized to generate an electromagnetic field for rotating said rotatable assembly, said stationary assembly further having an aperture therein in communication with the opening in said support member; and
impeller means on said rotatable assembly for moving air through said opening and said aperture.

26. The assembly of claim 25 further comprising a rotor shaft adapted to support said rotatable assembly and wherein said stationary assembly includes a bore adapted to receive said rotor shaft and wherein there are a plurality of apertures spaced around the bore.

27. The assembly of claim 26 further comprising means for lubricating the bore and rotor shaft.

28. The assembly of claim 27 wherein said stationary assembly comprises a cylindric bearing member having an axial opening therein adapted to receive the rotor shaft, and said means for lubricating surrounds said bearing member.

29. The assembly of claim 28 wherein said stationary assembly comprises a plurality of radial positioning members for centrally supporting said bearing member within said stationary assembly and said means for lubricating comprises a lubricant-soaked material located between said radial positioning members and around said bearing member.

30. A motor assembly comprising:
a support member adapted to be mounted on a stationary support for supporting said motor assembly;
an annular rotatable assembly including a plurality of permanent magnet elements and having at least one opening therein adapted to permit airflow therethrough;
a stationary assembly mounted on said support member and within and supporting said rotatable assembly, said stationary assembly having a plurality of winding stages adapted to be electrically energized to generate an electromagnetic field for rotating said rotatable assembly, said stationary assembly further having an aperture therein in communication with the opening in said annular rotatable assembly; and
impeller means on said rotatable assembly for moving air through said opening and said aperture.

31. The motor assembly of claim 30 wherein said support member has at least one opening therein adapted to permit airflow therethrough, the opening in said support member in communication with the aperture in said stationary assembly and the opening in said annular rotatable assembly; and wherein said impeller means moves air through said openings and said aperture.

32. The motor assembly of claim 30 wherein said impeller means moves air from a central area of said annular rotatable assembly to a peripheral area of said annular rotatable assembly.

33. The assembly of claim 32 wherein said rotatable assembly includes a rotor housing having a first side and a second side opposite the first side with the second side of said rotatable assembly facing said support member; and wherein said impeller means comprises a plurality of vanes mounted on the first side of the rotor housing.

34. The assembly of claim 33 wherein said impeller means ffurther comprises a plurality of fins mounted on the second side of the rotor housing.

35. The assembly of claim 30 wherein the opening of said support member is adapted to permit air on the second side to flow through the opening to the first side and further comprising means on said rotatable assembly for inhibiting air on the first side flowing back through the inlet opening to the second side.

36. A motor assembly comprising:
a support member adapted to be mounted on a stationary support for supporting said motor assembly and having at least one opening therein adapted to permit airflow therethrough;
an annular rotatable assembly including a housing supporting a plurality of permanent magnet elements and impeller means on said housing located between said housing and said support member for moving air from a central area of said annular rotatable assembly to a peripheral area of said annular rotatable assembly;

a stationary assembly mounted on said support member and within and supporting said rotatable assembly, said stationary assembly having a plurality of winding stages adapted to be electrically energized to generate an electromagnetic field for rotating said rotatable assembly; and impeller means on said rotatable assembly of r moving air in heat exchange relationship with said control means and through the opening in said support member.

37. The assembly of claim 36 wherein said rotatable assembly includes a rotor housing having a first side and a second side opposite the first side with the second side of said rotatable assembly facing said support member; and wherein said impeller means comprises a plurality of vanes mounted on the first side of the rotor housing.

38. The assembly of claim 37 wherein said impeller means further comprises a plurality of fins mounted on the second side of the rotor housing.

39. The assembly of claim 38 wherein the opening of said support member is adapted to permit air on the second side to flow through the opening to the first side and further comprising means on said rotatable assembly for inhibiting air on the first side flowing back through the inlet opening to the second side.

40. A rotatable assembly for use with a stationary assembly and control means in a dynamoelectric machine, said assembly comprising:

an annular housing having a peripheral portion and having first and second opposite sides;

a plurality of permanent magnet elements positioned around the peripheral portion of said housing; said control means connected to winding stages and mounted on a side of said stationary assembly and impeller means, on said housing, including a plurality of vanes mounted on the first opposite side for moving air in heat exchange relationship with the control means from a central area to a peripheral area of the dynamoelectric machine as said rotatable assembly is caused to rotate and including a plurality of fins mounted on the second opposite side for moving air in contact therewith.

* * * * *